US005149120A

United States Patent [19]

Halliday

[11] Patent Number: 5,149,120

[45] Date of Patent: Sep. 22, 1992

[54] WHEELCHAIR LOCK

[76] Inventor: Thomas S. Halliday, 111 Edgewater Dr., Needham, Mass. 02192

[21] Appl. No.: 755,080

[22] Filed: Sep. 5, 1991

[51] Int. Cl.[5] .......................... B62K 19/18; B62B 9/12

[52] U.S. Cl. .................................... 280/304.1; 280/42; 280/649; 280/650; 70/6; 70/34; 297/45; 297/DIG. 4; 403/85

[58] Field of Search .................. 280/250.1, 304.1, 647, 280/649, 650, 657, 42; 70/2, 6, 34, 39; 297/44, 45, DIG. 4; 403/84, 85, 88

[56] References Cited

U.S. PATENT DOCUMENTS

| | | | |
|---|---|---|---|
| 1,814,646 | 7/1931 | Terrill | 70/6 |
| 2,433,090 | 12/1947 | Cass | 297/44 |
| 2,522,729 | 9/1950 | Travis | 297/44 |
| 2,571,349 | 10/1951 | Eckles | 70/14 |
| 2,660,872 | 12/1953 | Beach | 70/6 X |
| 2,818,910 | 1/1958 | Hawkins | 297/DIG. 4 X |
| 4,166,631 | 9/1979 | Sanaski | 297/DIG. 4 X |
| 4,273,350 | 6/1981 | Williams | 280/250.1 |
| 4,324,119 | 4/1982 | Milton | 70/233 |
| 4,436,320 | 3/1984 | Brudermann et al. | 280/250.1 |
| 4,648,615 | 3/1987 | Volin | 280/250.1 |
| 4,779,885 | 10/1988 | Zinn | 280/304.1 |

FOREIGN PATENT DOCUMENTS

| | | | |
|---|---|---|---|
| 131075 | 12/1932 | Austria | 70/6 |
| 1943339 | 9/1978 | Fed. Rep. of Germany | 297/45 |
| 1168561 | 12/1958 | France | 297/44 |
| 2258818 | 8/1975 | France | 297/45 |
| 659257 | 10/1951 | United Kingdom | 70/2 |

*Primary Examiner*—Andres Kashnikow
*Assistant Examiner*—Brian L. Johnson
*Attorney, Agent, or Firm*—Henry D. Pahl, Jr.

[57] ABSTRACT

A locking apparatus is operative to selectively prevent the folding of a wheelchair of the type having a pair of centrally pivoted cross braces under the wheelchair seat. A bracket member is provided at each end of a pin which is adapted to constitute the pivot for the cross braces. An elongate bar is hinged at one end to one of the brackets and is adapted to be swung into a position between the cross braces so as to obstruct folding. A locking device operates between the other end of the bar and the other of the brackets for selectively retaining the bar in obstructing position.

6 Claims, 2 Drawing Sheets

WHEELCHAIR LOCK

BACKGROUND OF THE INVENTION

The present invention relates to wheelchair lock and more particularly to wheelchair locking apparatus which will prevent the collapsing of a folding wheelchair and thereby inhibit its theft.

The loss of wheelchairs from hospitals, rest homes and similar institutions constitutes a substantial element of cost for these enterprises. Most wheelchairs utilized in hospitals and rest homes are of a conventional folding variety even though there is seldom a need for utilizing the folding function. If the wheelchairs are left in their normal, easily foldable state, they are easily carried off or deliberately stolen by merely being folded and placed in the trunk of an automobile. The incidence of theft for wheelchairs which cannot be folded is, predictably, substantially lower. While it has previously been proposed to provide a locking mechanism for folding wheelchairs, such systems have typically been difficult to utilize and have involved locking components which separate from the wheelchair when the locking is not applied and are therefore easily lost or misplaced so that they are not readily available when locking should be implemented.

Among the several objects of the present invention it may be noted the provision of a novel wheelchair locking apparatus; the provision of such apparatus which will selectively prevent the folding of a wheelchair and more particularly a wheelchair of the type having a pair of centrally pivoted cross braces under the wheelchair seat; the provision of such apparatus which can remain attached to the wheelchair when the locking is not in effect; the provision of such apparatus which is highly effective and which is of relatively simple and inexpensive construction. Other objects and features will be in part apparent and in part pointed out hereinafter.

SUMMARY OF THE INVENTION

The locking apparatus of the present invention is operative to selectively prevent the folding of a wheelchair of the type having a pair of centrally pivoted cross braces under the wheelchair seat which move from an x-shaped configuration to a more parallel configuration when the wheelchair is folded. A bracket member is provided at each end of a pin which is adapted to constitute the pivot for the cross braces. An elongate bar is pivotally joined at one end to one of the brackets and is adapted to be swung into a position between the cross braces which obstructs folding. A locking means operates between the other end of the bar and the other of the brackets for selectively retaining the bar in obstructing position.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
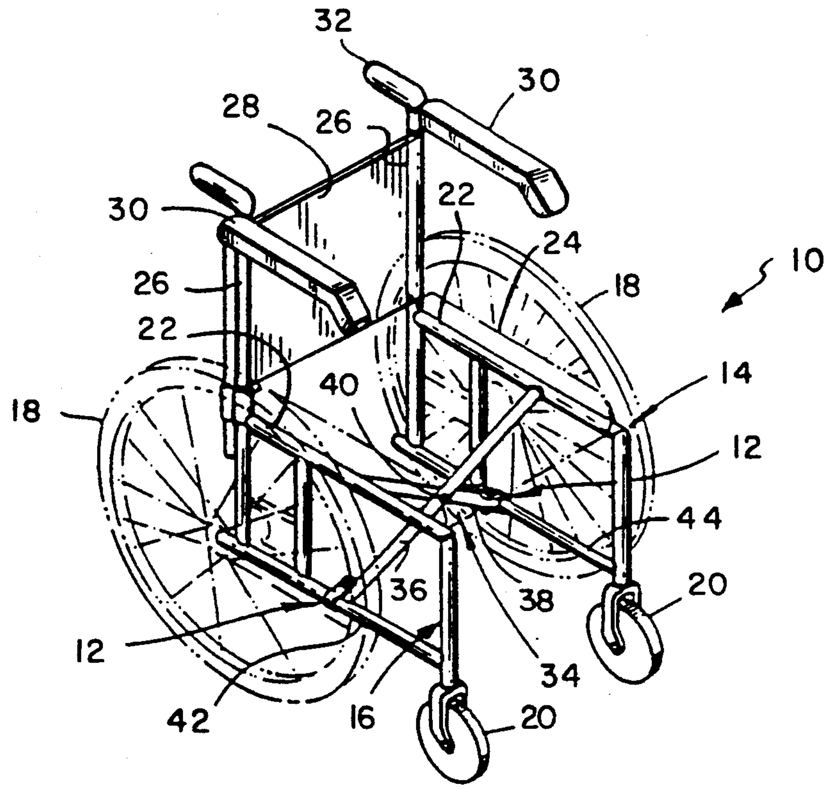
FIG. 1 PRIOR ART
FIG. 1 is a perspective view illustrating a folding wheelchair of the type (including centrally pivoted cross brace members under the wheelchair seat)to which the locking apparatus of the present invention may be applied.

As indicated previously, FIG. 1 illustrates a folding wheelchair of the general type to which the locking apparatus of the present invention may be applied. The wheelchair may, for example, be of the type disclosed in U.S. Pat. No. 4,779,885.

As shown in FIG. 1 drawing, a folding wheelchair frame referred to generally by the reference numeral 10 includes tubular components adapted for folding movement between an expanded configuration for normal wheelchair use and a collapsed compact configuration for facilitated transport and/or storage.

The general construction of the illustrative wheelchair frame 10 is representative of lightweight folding wheelchair frames formed predominantly from metal tubing members. More particularly, the wheelchair 10 conventionally includes left and right side frames 14 and 16 each including means for supporting a relatively large main rear wheel 18 and a relatively small front caster wheel 20 which support the wheelchair for normal rolling movement. The side frames 14 and 16 include longitudinally extending upper side rails 22 having a folding seat 24 such as a sling seat or the like extending therebetween. Armrests 30 and push handles 32 are normally provided at or near the upper end of the seatback posts 26, all in a well-known manner.

A cross brace unit 34 is connected between the side frames 14 and 16 to provide a movable support structure accommodating folding movement of the side frames between the expanded and collapsed positions. More particularly, as shown in FIG. 1, the cross brace unit 34 comprises a pair of tubular cross brace members 36 and 38 centrally pivoted to each other by a suitable pivot pin 40, with each cross brace member having its opposite ends connected to the opposite side frames. The folding frame 10 includes a pair of pivot joint assemblies 12 which permit easy folding and unfolding movement of the frame components as desired. In particular, the cross brace unit 34 supports the side frames 14 and 16 in the expanded position with the seat 2 and seatback 28 stretched therebetween for normal wheelchair use, and a collapsed or folded position (not shown) with the side frames 14 and 16 disposed in close side-by-side relation. In the expanded position the cross brace member are in an x-shaped configuration and in the collapsed position are in a more parallel configuration.

More specifically, the illustrative drawings depict the cross brace member 36 with an upper end secured as by welding to a selected point along the length of the upper side rail 22 forming a portion of the left side frame 14. From this connection, the cross brace member 36 extended downwardly and transversely across the frame 10 for connection to a lower side rail 42 on the right side frame 16 by means of the pivot joint assembly 12. The other cross brace member 38 extends from an upper end connected as by welding to the upper side rail 22 on the right side frame 16 for connection by the other pivot joint assembly 12 to a lower side rail 44 on the left side frame. Alternatively, if desired, the upper ends of the cross brace members 36 and 38 can be connected to the upper frame rails by alternative connection means, for example, by use of additional pivot joints of the type as indicated by reference character 12.

Figure 2:
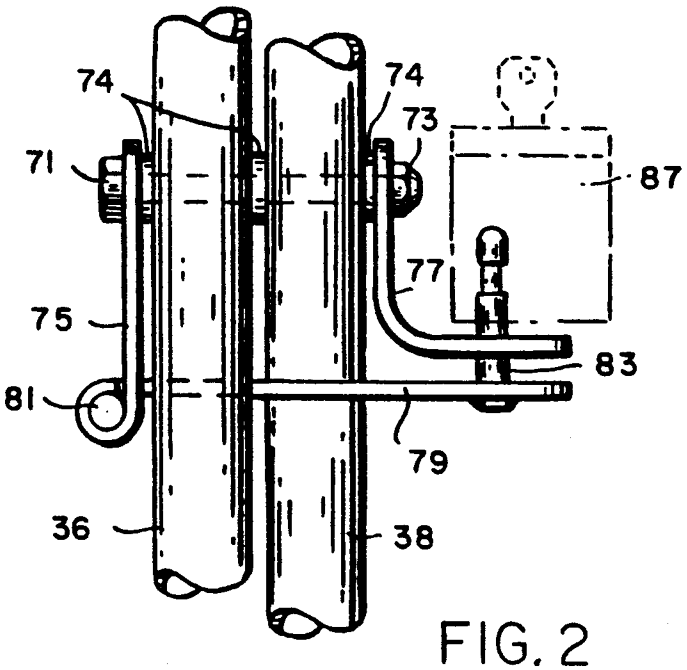
FIG. 2 is a side view, with parts broken away, of the locking apparatus of the present invention applied to the cross brace member of the wheelchair of FIG. 1.

As indicated previously, the locking apparatus of the present invention includes a pin which is adapted to constitute the pivot for the cross brace members 36 and 38 and which in typical use, replaces the pivot pin normally provided for linking the cross braces in standard folding wheelchair configurations. As illustrated in greater detail in FIGS. 2 and 3, the substitute pin is constituted by a bolt 71 retained in place by a locking nut 73. In order to prevent tampering, the nut may be secured to the threads of the bolt by an adhesive. A bracket 75 is provided at one end of the bolt and a bracket 77 is provided at the other end of the bolt. Washers 74 may be employed between the various relatively movable components as indicated.

Figure 4:
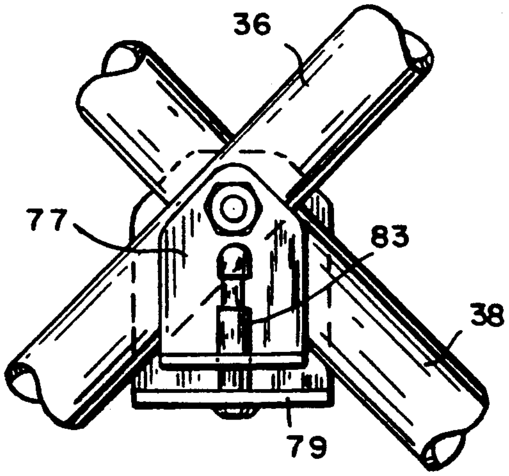
FIG. 4 is a front view of the locking apparatus.

An elongate bar 79 is pivotally connected to the bracket 75, e.g., by means of a hinge joint as indicated by reference character 81. When it is desired to effect locking, the bar 79 is swung up into the position illustrated by FIG. 2 so that, as may be seen in FIG. 4, the bar will obstruct the collapsing of the cross brace members 36 and 38 as would be required to fold or collapse the wheelchair. It should be understood that the bar 79 would also be effective to obstruct the folding of the wheelchair if it passed above the pivot point between the cross brace members 36 and 38. It is however preferred that the bar be underneath the pivot point so that it can easily hang out of the way when folding is needed.

A headed locking pin 83 is provided at the distal end of the bar 79 and when the bar is swung up into the obstructing or locking position, this pin extends through and an aperture 85 and the L-shaped bracket 77. A keyed lock body 87 engages the headed end of the pin 83 to selectively secure the bar in obstructing position. As should be understood, an alternate construction would be to have the pin extend downward from the bracket 77 and to provide a matching aperture in the bar 79.

Figure 3:
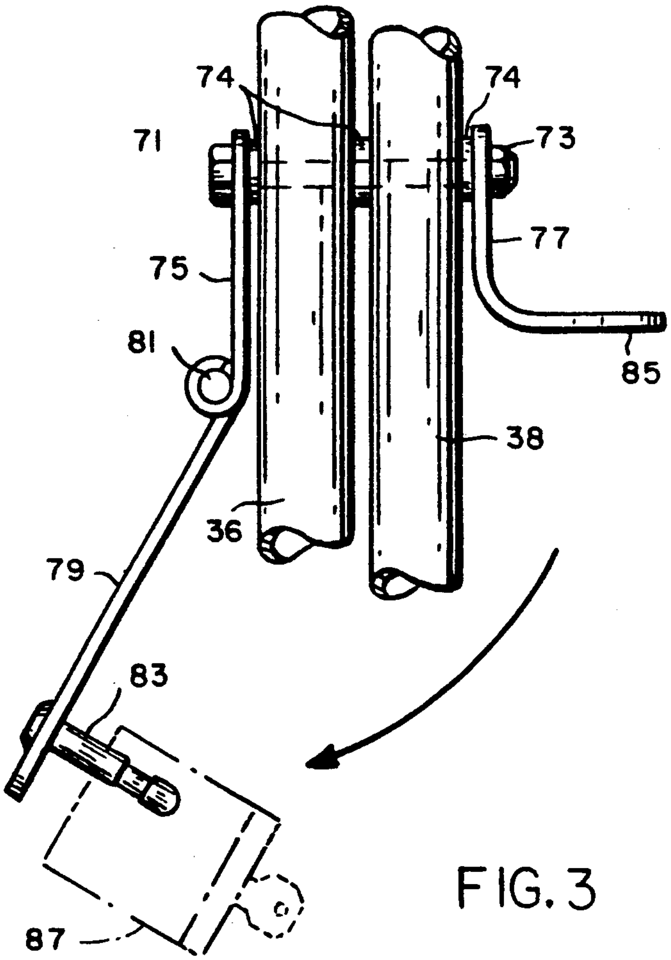
FIG. 3 is a side view showing the locking apparatus in unlocked position.

When the folding capability of the wheelchair is needed, the lock body is unlocked and the bar 79 is allowed to merely hang down out of the way of folding as illustrated in FIG. 3. The lock body 87 can be returned to the pin 83 so that it stays with the wheelchair. The keyed lock body 87 may, for example, be for the model 443 available from the Master Lock Company of Milwaukee, Wis. For use in an institutional setting, a plurality of lock bodies operated by a common key may be effectively utilized so as to reduce the number of keys necessary and the number of persons having access to the keys.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Locking apparatus for selectively preventing the folding of a wheelchair of the type having a seat, sides and a pair of centrally pivoted cross braces for interconnecting the sides and located under the wheelchair seat which move from an x-shaped configuration to a more parallel configuration when the wheelchair is folded, said locking apparatus comprises:

- a pin having opposite sides and comprising the pivot for said cross braces:
- a bracket member mounted at each end of said pin;
- an elongated bar which is pivotally joined at one end to one of said brackets, and is adapted to be swung into a position between said cross braces to thereby obstruct the folding; and
- locking means removably mounted at the other end of said bar and the other of said brackets for selectively retaining said bar in obstructing position.

2. Locking apparatus as set forth in claim 1 wherein said locking means includes a headed pin on one of said bar and said other bracket which passes through an aperture in the other of said bar and said other bracket.

3. Locking apparatus as set forth in claim 2 wherein said locking means includes a lock body which can engage said headed pin and thereby selectively retain said bar in obstructing position.

4. Locking apparatus as set forth in claim 1 wherein said lock body is adapted to be selectively released from said headed pin by the use of a key.

5. Locking apparatus as set forth in claim 1 wherein said bar and said one bracket are connected by means of a hinge joint.

6. Locking apparatus for selectively preventing the folding of a wheelchair of the type having a seat, sides and a pair of centrally pivoted cross braces for interconnecting the sides and located under the wheelchair seat which move from an x-shaped configuration to a more parallel configuration when the wheelchair is folded, said locking apparatus comprises:

- a pin having opposite ends and which passes through and comprises the pivot for said cross braces:
- an L-shaped bracket member mounted at one end of said pin;
- a bracket and a bar which are connected by a hinge joint, said bracket being secured at the other end of said pin, said bar having a headed pin which is adapted to pass through an aperture in said L-shaped bracket when said bar is swung into a position between said cross braces to thereby obstruct the folding; and
- lock means selectively engaging said headed pin for selectively retaining said bar in obstructing position.

* * * * *